United States Patent [19]

Le Breton

[11] Patent Number: 5,216,924
[45] Date of Patent: Jun. 8, 1993

[54] PASSIVE FLOWMETER FOR DETERMINING THE FLOW RATE AND THE DIRECTION OF FLOW IN A WELL

[75] Inventor: Jean-Marc C. Le Breton, Issy-Les-Moulineaux, France

[73] Assignee: Schlumberger Technology Corporation, Houston, Tex.

[21] Appl. No.: 451,262

[22] Filed: Dec. 15, 1989
(Under 37 CFR 1.47)

[30] Foreign Application Priority Data

Dec. 21, 1988 [FR] France ............... 88 16868

[51] Int. Cl.⁵ ............................................. E21B 47/10
[52] U.S. Cl. ........................................ 73/155; 73/861.78; 324/207.25; 324/174
[58] Field of Search ............... 73/155, 861.77, 861.78, 73/861.79; 324/207.25, 207.23, 207.15, 174; 340/672

[56] References Cited

U.S. PATENT DOCUMENTS

| | | | |
|---|---|---|---|
| 2,728,893 | 12/1955 | Bartelink | 73/861.78 |
| 3,036,460 | 5/1962 | White et al. | 73/155 |
| 3,162,042 | 12/1964 | Hart | 73/155 |
| 3,210,658 | 10/1965 | Stevens | 340/672 |
| 3,433,070 | 3/1969 | Grimaldi | 73/861.78 |
| 3,772,916 | 11/1973 | Booth et al. | 73/861.77 |
| 3,905,226 | 9/1975 | Nicolas | 73/861.79 |
| 3,930,201 | 12/1975 | Ackermann et al. | 340/672 |
| 3,934,467 | 1/1976 | Nicolas | 73/861.79 |
| 4,011,757 | 3/1977 | Baatz | 73/861.79 |
| 4,140,013 | 2/1979 | Hunger | 73/861.77 |
| 4,164,866 | 8/1979 | Mitchell et al. | 73/861.77 |
| 4,308,755 | 1/1982 | Millar et al. | 73/861.77 |
| 4,566,317 | 1/1986 | Shakra | 73/155 |
| 4,646,085 | 2/1987 | Mathis | 340/672 |
| 4,754,642 | 7/1988 | Miyairi et al. | 73/861.78 |

FOREIGN PATENT DOCUMENTS

| | | | |
|---|---|---|---|
| 0949655 | 9/1949 | France . | |
| 84517 | 7/1981 | Japan | 73/861.78 |
| 2102129 | 1/1983 | United Kingdom | 73/861.78 |

Primary Examiner—Hezron E. Williams
Assistant Examiner—Michael Brock
Attorney, Agent, or Firm—Henry N. Garrana; Darcell Walker

[57] ABSTRACT

A passive flowmeter for determining the flow rate and the direction of flow of a fluid in a well comprises a magnetic generator (29) suitable for being rotated about an axis (RR) and including at least one north pole (N) and at least one south pole (S) lying flush with a first plane (P1) perpendicular to the axis (RR). The flowmeter also includes a magnetic detector (33) constituted by a magnetic core (34) supporting a coil (40) and extended by two magnetic terminal portions (36, 38) having spaced apart end surfaces which are disposed substantially flush with a second plane (P2) facing said first plane. The end surfaces of a terminal portion have areas which are different from the end surfaces of the other terminal portion. The poles of the magnetic generator (29) are angularly spaced about the axis (RR) by an angle such that the variations of magnetic flux generated through the coil (40) by rotation of the magnetic generator (29) have a cycle ratio which is other than unity.

12 Claims, 5 Drawing Sheets

FIG. 1
FIG. 2
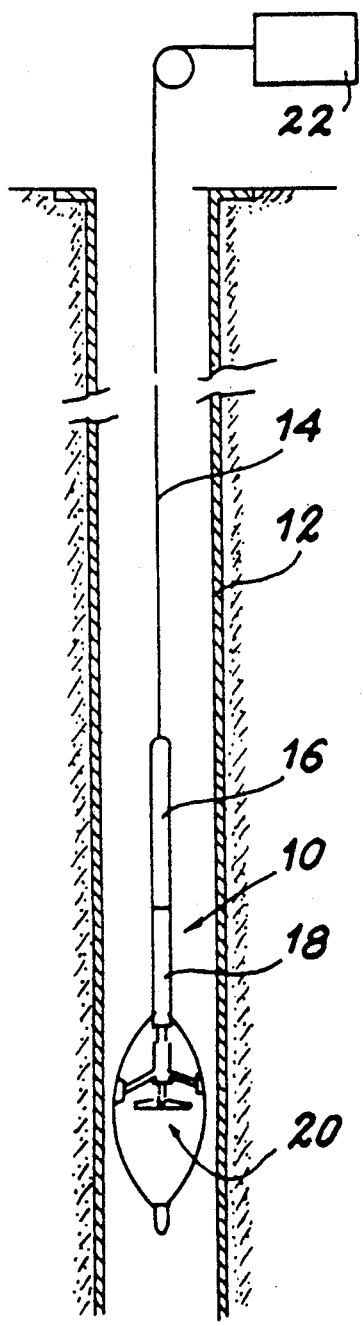
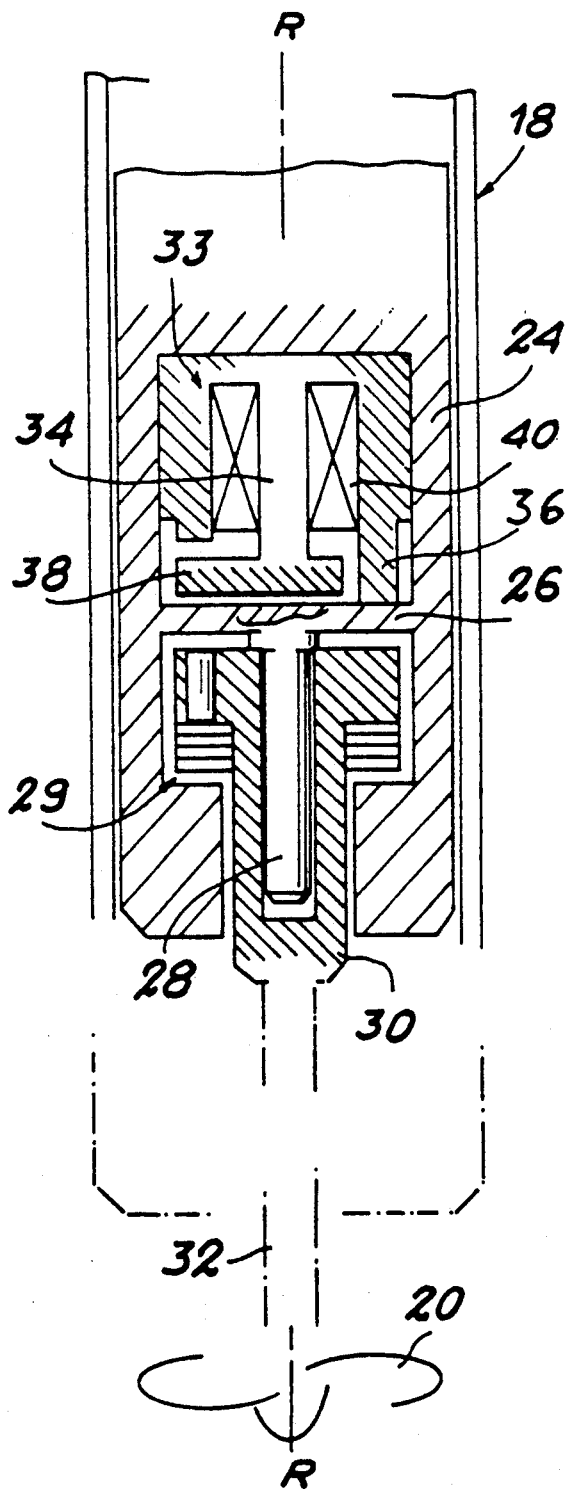

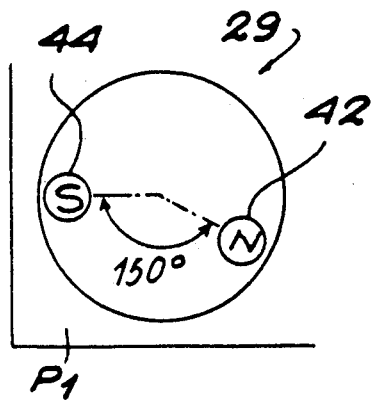
FIG. 4A
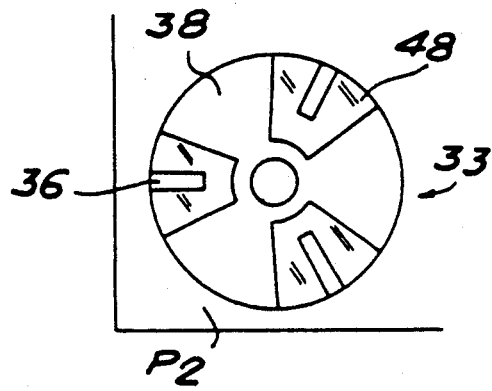
FIG. 4B
FIG. 5
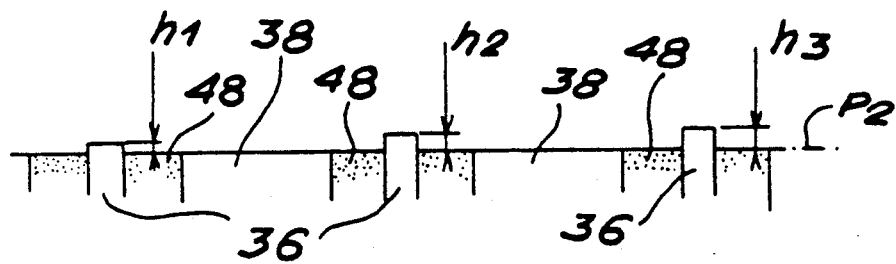

PASSIVE FLOWMETER FOR DETERMINING THE FLOW RATE AND THE DIRECTION OF FLOW IN A WELL

BACKGROUND OF THE INVENTION

The present invention relates to a passive flowmeter for determining the flow rate and the direction of flow of a fluid in a well.

In a producing well it is important to determine the mean flow rate of the fluid flowing therein as a function of depth. This information serves to locate the production zones. Also, it is important to determine the direction of fluid flow in the well simultaneously with the flow rate.

A conventional flowmeter used for logging production well generally comprises a support adapted to be lowered into the well at the end of a cable and a spinner rotatably mounted on the support. The speed of rotation of the spinner is a function of the flow rate of the fluid in the borehole. The direction of rotation of the spinner is a function of the direction of flow of the fluid in the borehole.

The flowmeter comprises a sensor for generating electrical signals representative of the speed and the direction of rotation of the spinner. These signals are electrical pulses whose period is a function of the speed of rotation. The pulses can be counted to provide the speed of rotation of the spinner. The signals are transmitted through the cable to the surface where the speed and the direction of rotation of the spinner are recorded as a function of depth.

U.S. Pat. No. 3,433,070 describes a device which generates electrical signals from which the flow rate and the direction of flow of a fluid are determined. This device is an active device. More precisely, an electrical generator provides a sinewave electrical signal to a coil. The coil is a portion of a resonant circuit and the frequency of the electrical signal is equal to the resonant frequency of the system.

The coil surrounds a fixed magnetic bar which is excentric relative to the axis of the coil. Variation in the tuning of the resonant circuit is measured while an asymmetrical magnetic member is rotated about the coil. The moving magnetic member is rotated by the spinner.

The changes in inductance of the coil during rotation of the moving member modulate the amplitude of the electrical signal flowing through the coil. This modulation is measured electrically in such a manner as to determine the flow rate and the direction of fluid flow.

U.S. Pat. No. 4,566,317 describes another active device generating signals which enable the flow rate and the direction of flow of a fluid to be deduced.

A metal cross is fixed to the spinner. Two fixed coils face the cross. Each of the coils is connected to a resonant circuit and is fed with a periodic electric current. The cross is rotated by the spinner and this changes the amplitude of the electrical current flowing through the coils since the impedance of each coil is modified by the proximity of the metal arms of the cross.

Each rotation of the cross generates current pulses at the outlet of each oscillating circuit and these pulses are processed electronically for the purpose of deducing the flow rate and the direction of flow of the fluid.

These two active devices suffer from the major drawback of requiring sources of electrical current which are perfectly stable for delivering current to be modulated by the rotation of the spinner.

U.S. Pat. No. 3,162,042 describes a passive device providing an electrical signal from which the flow rate and the direction of flow of the fluid can be deduced. An annular magnetic core supports three equidistant coils which are interconnected. In the central portion of the annular core, a magnetic element having a north pole and a south pole is rotated by the spinner. Current is thus generated in the coils and the desired information can be deduced therefrom after processing.

An object of the present invention is to provide a passive device delivering an asymmetric periodic signal which, after appropriate electronic processing, makes it possible to deduce the mean flow rate and the direction of flow of a fluid in a well.

The present invention makes it possible to perform such measurements with improved resolution, even when the fluid flow rate is low.

SUMMARY OF THE INVENTION

According to the present invention, a flowmeter for use in a well is provided comprising: a support; a spinner rotatably mounted about an axis on said support; magnetic detector means fixed to said support and including a magnetic core between two magnetic terminal portions and an electrically conductive coil wound about said core; and magnetic generator means fixed to said spinner and including at least one north pole and at least one south pole to generate a variable magnetic flux through said coil when said spinner is rotated.

The magnetic terminal portions of the detector means have spaced end surfaces of different areas substantially located in a plane extending perpendicularly to said axis and the north and south poles are facing said plane opposite the end surfaces of said terminal portions. The poles are angularly spaced about said axis by an angle such that the variations in the generated magnetic flux present a cycle ratio other than unity.

In a periodic signal having positive and negative half cycles, the cycle ratio is defined as the ratio between the duration of positive half cycles divided by the duration of negative half cycles.

Preferably, the gap between adjacent end surfaces of the terminal portions is taken as small as possible, thereby improving the closure of magnetic lines between the generator and the detector magnetic means.

In addition, this arrangement serves to avoid a latching couple: when the device is at rest, the north and south poles do not take up a preferred position. This avoid generating parasitic periodic waves in the electrical signals produced at the terminals of the coil when the magnetic generator means rotates.

The features and advantages of the invention appear more clearly from the following description given by way of non-limiting example. The description refers to the accompanying drawings, in which:

BRIEF DESCRIPTION OF THE DRAWINGS

FIG. 1 is a diagram of a flowmeter suspended down a producing well;

FIG. 2 is a diagrammatic section through a first embodiment of a device in accordance with the present invention;

FIGS. 4A and 4B are diagrammatic right cross-sections in planes P1 and P2 through the first and second magnetic circuits respectively of the first embodiment of a device in accordance with the invention;

FIG. 5 is a diagrammatic developed view of the terminal portions of the second magnetic circuit in the plane P2 applicable to a variant of the first embodiment of a device in accordance with the invention;

DETAILED DESCRIPTION

Figure 3:
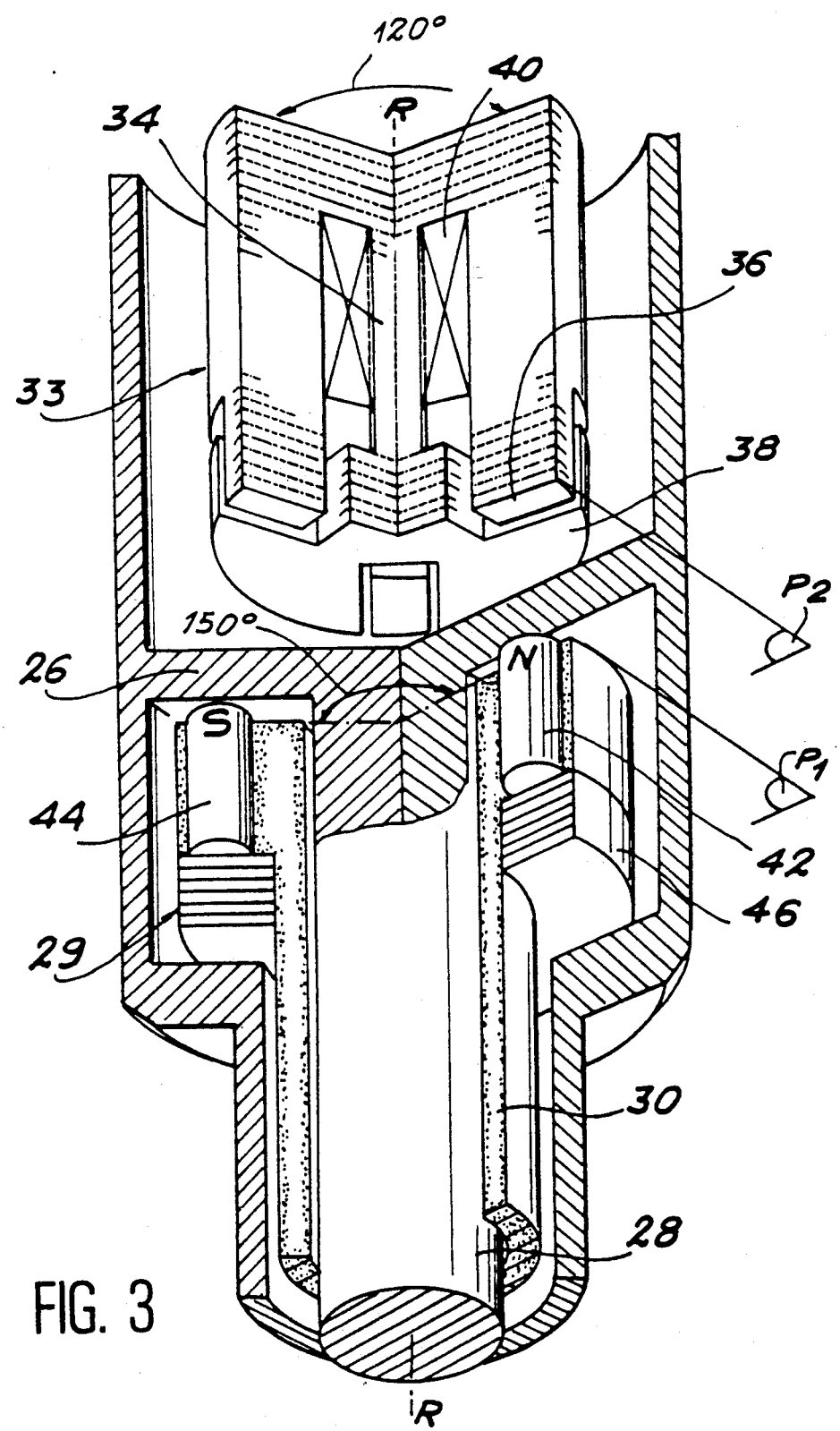
FIG. 3 is a partially cut-away diagram of the first embodiment of the invention.

FIG. 1 is a diagram showing a flowmeter suspended in a production well. In conventional manner, the flowmeter 10 is suspended down the well 12 at the end of a cable 14 which is wound onto a winch (not shown) enabling the apparatus 10 to be moved along the well. The flowmeter 10 essentially comprises an electronics cartridge 16 containing electrical circuits, and a bottom portion 18 fitted with a spinner 20 whose speed of rotation is a function of the flow rate of the fluid in the borehole. The direction of rotation of the spinner 20 is a function of the direction of flow of the fluid in the borehole.

The apparatus 10 generates electrical signals representative of the speed and the direction of rotation of the spinner 20. These signals are electrical pulses whose period is a function of the speed of rotation. The pulses are counted by one of the electronic circuits in the cartridge 16 which contains a clock delivering reference pulses. The speed of rotation of the spinner 20 can thus be deduced. These signals are transmitted via a conductor fixed to the cable 20 to a processing and recording assembly 22 located on the surface. This assembly 22 serves to record the speed and the direction of rotation of the spinner 20 as a function of its depth, from which the mean flow rate of the fluid in the borehole can be deduced as can its direction of flow.

FIG. 2 is a diagrammatic section showing a first embodiment of a device in accordance with the invention. In order to clarify the description, only the bottom portion 18 of the flowmeter is shown. This portion 18 contains a support 24, e.g. made of titanium. The support 24 holds a magnetic sensor for converting the rotary motion of the spinner 20 into electrical signals representative of said motion. The support 24 has first and second cavities separated by a wall 26 which is sufficiently thick to withstand pressure differences which may be greater than 150 MPa. The first cavity is subjected to the pressure of the fluid which may be as much as 150 MPa, whereas the second cavity is subjected to atmospheric pressure. The wall may be 2.5 mm thick, for example. The wall 26 has a cylindrical portion 28 which extends downwards in the first cavity to rotatably receive the spinner 20 about an axis of rotation RR.

A magnetic sensor comprises a magnetic induction generator 29 able to rotate about the axis RR. This magnetic generator 29 is fixed on the upper portion 30 of a shaft 32 of the spinner 20, the upper portion 30 of the shaft being rotatably mounted in the first cavity around the cylindrical portion 28. The magnetic generator 29 comprises e.g. a permanent magnet which rotates with the spinner 20 about the cylindrical portion 28. The upper portion 30 of the shaft may be made of titanium, for example.

The magnetic sensor also comprises a magnetic detector 33 which is fixed to the support 24 and placed in the second cavity in the vicinity of the magnetic generator 29.

The magnetic detector 33 includes a magnetic core 34, e.g. a soft iron core, which has been subjected to conventional heat treatment in order to improve its magnetic permeability. The core 34 is extended by two terminal magnetic portions 36 and 38.

An electrically-conducting coil 40 surrounds at least a portion of the core 34. The terminals of the coil 40 are connected to the electronics cartridge 16.

FIG. 3 is a diagrammatic cut-away view of a magnetic sensor in accordance with the first embodiment of the invention.

The magnetic generator 29 comprises a permanent magnet having a north pole (reference N) and a south pole (reference S) which are flush with a first plane P1 extending perpendicularly to the axis RR. This permanent magnet is, in fact, constituted by two permanent magnets 42 and 44 which are interconnected via opposite poles and a piece 46 made of soft iron which has been heat treated in conventional manner so as to improve its magnetic permeability.

The terminal portions 36 and 38 of the magnetic detector are substantially flush with a second plane P2 extending perpendicularly to the axis RR and facing the first plane P1. Each of the terminal portions 36 and 38 have different area in said second plane P2.

Each terminal portion 36 and 38 has a number M of end surfaces which are distributed around the axis RR over the second plane P2. The end surfaces of one of the terminal portions alternate with the end surfaces of the other terminal portion. Naturally, any two successive end surfaces are spaced apart in order to avoid any magnetic short circuiting.

In the example shown in FIG. 3, the number M is equal to 3. In addition, the end surfaces of each terminal portion are regularly spaced from one another around axis RR.

It can be seen that in this embodiment, the core 34 has a longitudinal direction disposed parallel to the axis RR, thereby making it possible to use a winding having a large number of turns (about 15,000) and thus increasing the electrical signal obtained at the terminals of the coil 40 when the magnetic generator 29 rotates.

FIGS. 4A and 4B are diagrammatic cross-sections in the planes P1 and P2 respectively through the magnetic generator and detector of the embodiment shown in FIG. 3.

The angle between the north and south poles in the magnetic generator is such that the variations in the magnetic flux passing through the coil 40 have a cycle ratio which is different from unity. In other words, the flux change has two different slopes depending on whether the signal is going from minimum flux to maximum flux or vice versa.

This means that the angle between the north and south poles must necessarily be different from 180°. If the angle were 180°, then the electrical signal generated in the coil 40 would be symmetrical and it would not be possible to deduce the direction of rotation of the spinner 20. A similar problem would arise if the poles were 120° apart since that terminal corresponds to the symmetry of the end surfaces of the terminal portions 36 and 38.

The values selected for this angle also depend on the reluctance between the two magnetic circuits (i.e. on the thickness of the wall 26 and on the material from which the wall is made).

For a wall 26 made of titanium and having a thickness of 2.5 mm, the electrical signals passing through the coil 40 during rotation of the first magnetic circuit reaches a maximum when the angle between the north and south poles is 150°.

In FIG. 4B, it can be seen that the end surfaces of the terminal portions 36 and 38 are spaced apart. In addition, in order to avoid magnetic short circuits, the gap between two successive end surfaces is filled by non-magnetic material 48.

FIG. 5 is a developed diagram showing the terminal portions of the magnetic detector in the plane P2. This figure shows a variant of the first embodiment.

In order to obtain the direction and the speed of rotation of the spinner 20, it suffices, as proposed by the invention, to cause the electrical signal produced at the terminals of the coil 40 to be asymmetrical during rotation of the first magnetic circuit 29. this is achieved, essentially, by causing the end surfaces of the terminal portions 36 and 38 to have different areas in the plane P2.

In order to facilitate electrical processing of the signal delivered by the coil, the passage of at least one of the poles of the permanent magnet past each end surface of one of the terminal portions is made identifiable.

By placing the end surfaces of one of the terminal portions (e.g. 36) at different heights h1, h2, h3 relative to the surface P2, then the reluctance between the magnetic generator 29 and the magnetic detector 33 is different for each of the end surfaces of the terminal portion 36. This makes it possible to mark the passage of a pole past each of these end surfaces.

Figure 6:
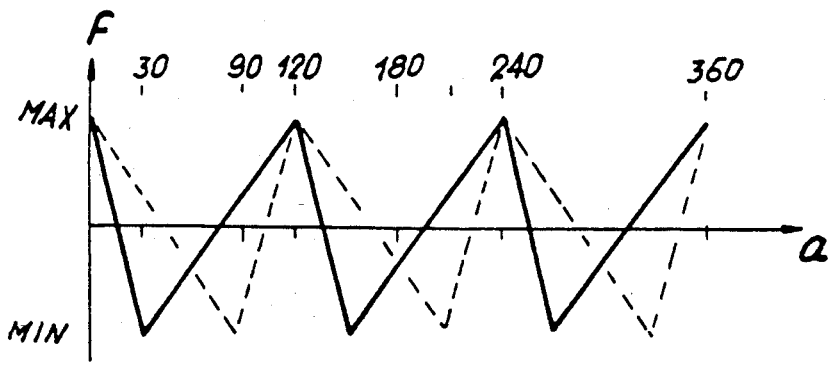
FIG. 6 is a waveform diagram showing the change in magnetic flux passing through the coil as a function of rotation of the first magnetic circuit.

FIG. 6 is a waveform diagram showing the change in magnetic flux passing through the coil 40 as a function of rotation of the magnetic generator 29 from a reference position chosen at a flux maximum.

The magnetic flux is designated by f, and its maximum and minimum values are designated by fmax and fmin, respectively. In the first embodiment where each terminal portion of the core 34 has three end surfaces, and where the magnetic generator 29 has only one south pole and one north pole, then the magnetic flux passing through the coil 40 has the appearance of an asymmetrical sawtooth waveform.

For one complete turn in the clockwise direction (solid line curve), f takes on its maximum value fmax at angles a of 0°, 120°, 240°, and 360° respectively, whereas it is equal to fmin at angles of 30°, 150°, and 270°. The angle a is selected in such a manner as to be equal to 0 when the south pole S is opposite an end surface 36, i.e. as shown in FIGS. 4A and 4B.

Over a complete turn in the counter-clockwise direction (dashed line curve), the flux f takes its maximum value fmax at angles a (counting in the negative direction) which are equal to 0°, 120°, 240°, and 360°. The flux f is equal to fmin at angles of 90° C., 210°, and 330°.

It can thus be seen that the flux is asymmetrical in appearance and that this asymmetrical appearance differs depending on whether the magnetic generator 29 is rotating in one direction or the other.

Figure 7A:
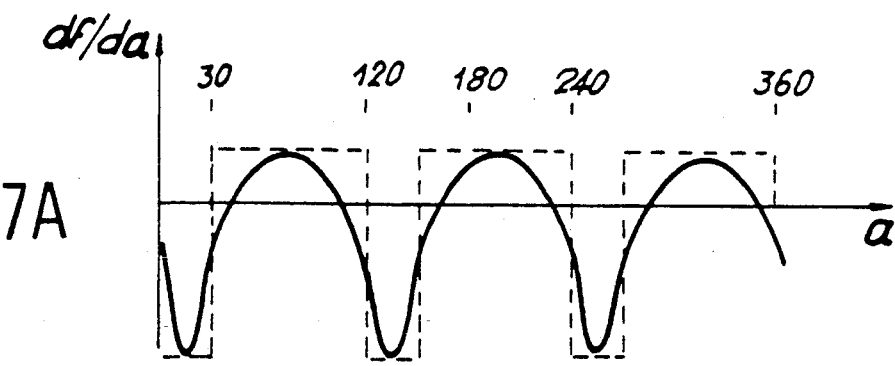
FIGS. 7A to 7C are waveform diagrams showing the derivative with respect to time of the magnetic flux passing through the coil as a function of rotation of the first magnetic circuit.
Figure 7B:
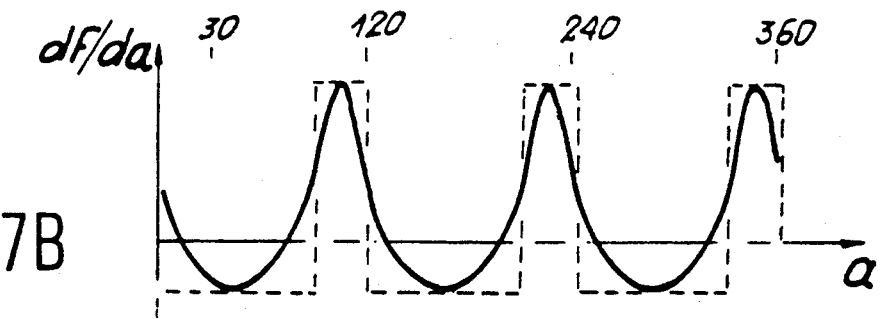
Figure 7C:
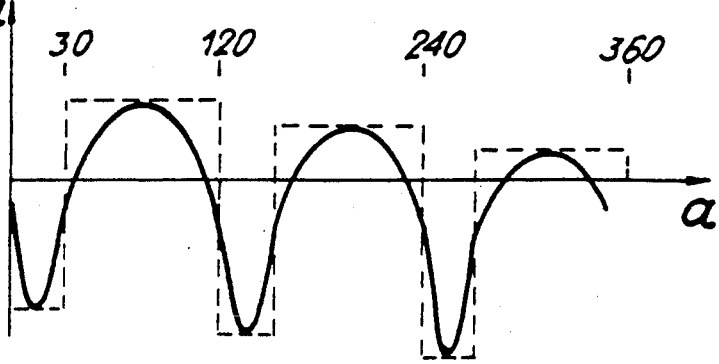

FIGS. 7A to 7C are waveform diagrams showing the derivative df/da of the magnetic flux relative to the angle a as a function of the angle of rotation a in various different cases. The electrical signal at the terminals of the coil 40 is proportional to df/da and not to f. The average flow rate and the direction of fluid flow in a well are deduced from the curve showing variation in df/da as a function of time. In order to provide examples which are independent of speed, only variations in df/da as a function of rotation of the first magnetic circuit are shown below. Depending on the speed of rotation, the time constants in df/da change, but the appearance of the curves is indeed as follows.

In FIG. 7A, the dashed line shows the theoretical curve of df/da corresponding to the flux f shown in FIG. 6 as measured during one complete rotation in the counter-clockwise direction. The solid line curve is taken from experimental tests. It can be seen that a rectangular waveform is not actually obtained: this is due to skin effect and to parasitic filtering due to the electronic circuits used, since no electronic component is perfect.

FIG. 7B is a diagram showing the derivative df/da of the magnetic flux f during one complete revolution in the clockwise direction.

FIG. 7C is a diagram of the derivative df/da of the magnetic flux f during one complete revolution in the counter-clockwise direction for a device in accordance with the variant embodiment where the ends of the terminal portions of the core 34 are disposed at different heights h1, h2, and h3 (see FIG. 5).

The dashed line curve in FIG. 7C is the theoretical curve whereas the solid line curve is the curve obtained from experimental testing. It can be seen that f has three maxima and three minima, all at different values, thereby making it possible to identify each end surface of the terminal portions of the coil supporting core 34. This makes it possible to reduce errors and to improve the electronic processing of the signal in order to deduce the direction and the mean flow rate of the fluid.

Figure 8:
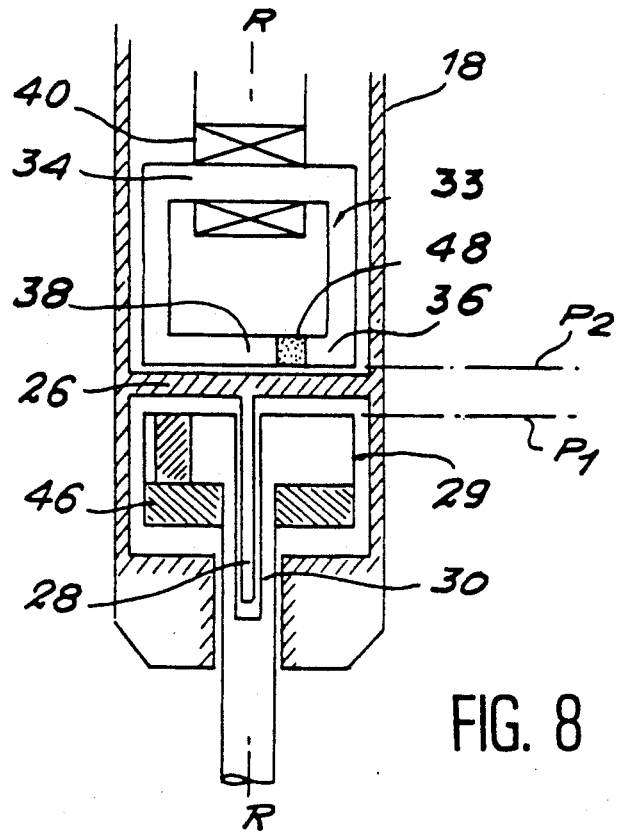
FIG. 8 is a diagrammatic section through a second embodiment of a device in accordance with the invention.

FIG. 8 is a diagrammatic section through a second embodiment of a device of the invention. In this embodiment, each terminal portion 36 and 38 has a single end surface. The core 34 is disposed transversely and its supports the coil 40.

The magnetic induction generator 29 comprises two magnets angularly spaced by 90° for example (only one is shown in FIG. 8 which is a section on a plane containing the axis of rotation). The opposite poles of these two magnets are interconnected by a heat treated soft iron part 46, for example.

Figure 9A:
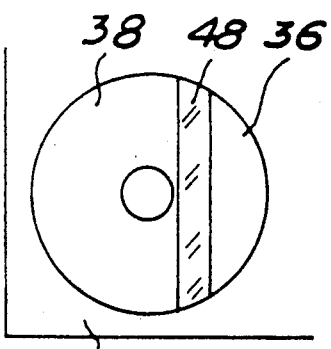
FIGS. 9A and 9B are diagrammatic right cross-sections in planes P1 and P2 through first and second magnetic circuits respectively of a second embodiment of a device in accordance with the invention.
Figure 9B:
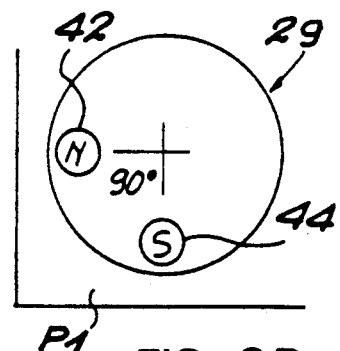

FIGS. 9A and 9B are diagrammatic right cross-sections in planes P1 and P2 respectively through the magnetic generator 29 and the magnetic detector 33 of the second embodiment.

The magnets 42 and 44 are placed at 90° from each other, for example, with the north pole of one of them and the south pole of the other being flush with the plane P1.

The end surfaces of the terminal portions 36 and 38 are disposed close to each other to substantially fill the area of a disk in the plane P2. Naturally, they are spaced from each other and a piece of non-magnetic material 48 is disposed between them in order to prevent any danger of a magnetic short circuit.

Figure 10:
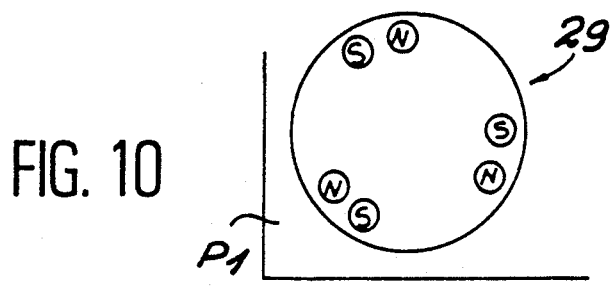
FIG. 10 is a diagrammatic right cross-section in plane P1 through the first magnetic circuit of a variant embodiment of the device of the invention.

The invention is naturally not limited to the particular embodiments specifically described above. On the contrary, it extends to any variant thereof. In particular, as can be seen in FIG. 10 which is a diagrammatic right cross-section in plane P1 through the first magnetic circuit 29, the induction generator may have six poles which are alternatively north and south and which are interconnected in north-south pairs. The pairs are equidistant from one another.

This generator may be made using six permanent magnets which may be interconnected, for example, by a magnetic piece of heat treated soft iron.

The resolution of the system is thus increased by increasing the number of poles in the magnetic generator 29. However it is preferred to obtain this result by increasing the number M of end surfaces of the terminal portions and using a limited number of poles on the magnetic generator.

I claim:

1. A flowmeter for use in a well comprising:
   a support;
   a spinner rotatably mounted about an axis on said support;
   magnetic detector means fixed to said support and including a magnetic core between two magnetic terminal portions having spaced end surfaces of different areas substantially located in a plane extending perpendicularly to said axis, said magnetic detector means further including an electrically conductive coil wound about said core; and
   magnetic generator means fixed to said spinner and including at least one north pole and at least one south pole facing said plane opposite the end surfaces of said terminal portions, to generate a variable magnetic flux through said coil when said spinner is rotated, said poles being angularly spaced about said axis by an angle such that the variations in the generated magnetic flux present a cycle ratio other than unity.

2. A flowmeter according to claim 1, wherein each terminal portion has a number of end surfaces regularly disposed around said axis, the end surfaces of one of said terminal portions being alternately disposed with the end surfaces of the other terminal portion.

3. A flowmeter according to claim 1, wherein said magnetic core has a longitudinal axis disposed parallel to said axis.

4. A flowmeter according to claim 1, wherein said magnetic core has a longitudinal axis disposed transversely relative to said axis.

5. A flowmeter according to claim 1, wherein a non-magnetic material is disposed between the terminal portions of said magnetic detector means, the surface of said non-magnetic material being substantially level with the end surfaces of said terminal portions.

6. A flowmeter according to claim 1, wherein said magnetic generator means comprises a number of north poles and an equal number of south poles, the north and south poles being distributed alternately about said axis.

7. A flowmeter according to claim 2, wherein the number of end surfaces of each terminal portion is equal to three.

8. A flowmeter according to claim 7, wherein the magnetic generator means has a north pole and a south pole which are angularly spaced by 150°.

9. A flowmeter according to claim 1, wherein each terminal portion of said magnetic detector means has a single end surface, and wherein said magnetic generator means has a north pole and a south pole which are angularly spaced by an angle of 90°.

10. A flowmeter according to claim 1, wherein said support comprises first and second cavities separated by a non-magnetic wall, said first cavity being sealed from the well fluids and adapted to receive said magnetic detector means and said second cavity being subjected to the pressure of the well fluids and adapted to receive said magnetic generator means.

11. A flowmeter sensor for determining the speed and the direction of rotation of a spinner rotatably mounted about an axis on a support, comprising:
    a magnetic element fixed to said support and including a core portion between first and second terminal portions, said terminal portions having each a plurality of end surfaces which are substantially located in a plane perpendicular to said axis, the end surfaces of said first and second terminal portions having different areas and being alternately disposed around said axis,
    a detecting coil wound around said core portion; and
    at least one magnetic north pole and one magnetic south pole fixed to said spinner opposite the end surfaces of said terminal portions, to generate a variable magnetic flux through said coil when said spinner is rotated, said poles being angularly spaced about said axis by an angle such that the variations in the generated magnetic flux present a cycle ratio other than unity.

12. A flowmeter for use in a well comprising:
    a support;
    a spinner rotatably mounted about an axis on said support;
    magnetic detector means fixed to said support and including a magnetic core between, and perpendicular to, first and second magnetic terminal portions, each of said terminal portions having a plurality of equal-area end surfaces regularly disposed around said axis, the end surfaces of said first terminal portion being alternately disposed with the end surfaces of said second terminal portion, wherein the surface area of the end surfaces of said first terminal portion is different than the surface area of the end surfaces of said second terminal portion and wherein said first end surfaces are placed in different planes relative to each other and to the end surfaces of said second terminal, said magnetic detector means further including an electrically conductive coil wound about said core; and
    magnetic generator means fixed to said spinner and including at least one north pole and at least one south pole facing a plane parallel to the end surfaces of said first and second terminal portions, to generate a variable magnetic flux through said coil when said spinner is rotated, said poles being angularly spaced about said axis by an angle such that the variations in the generated magnetic flux present a cycle ratio other than unity.

* * * * *